(12) United States Patent
Mola

(10) Patent No.: US 11,836,070 B2
(45) Date of Patent: *Dec. 5, 2023

(54) REDUCING TRACE RECORDING OVERHEADS WITH TARGETED RECORDING VIA PARTIAL SNAPSHOTS

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/693,217

(22) Filed: Mar. 11, 2022

(65) Prior Publication Data

US 2022/0197779 A1      Jun. 23, 2022

Related U.S. Application Data

(63) Continuation of application No. 16/581,570, filed on Sep. 24, 2019.

(51) Int. Cl.
   *G06F 11/00*    (2006.01)
   *G06F 11/36*    (2006.01)
   *G06F 11/30*    (2006.01)

(52) U.S. Cl.
   CPC ...... *G06F 11/3636* (2013.01); *G06F 11/3096* (2013.01); *G06F 11/366* (2013.01)

(58) Field of Classification Search
   CPC . G06F 11/3636; G06F 11/3096; G06F 11/366
   See application file for complete search history.

(56) References Cited

U.S. PATENT DOCUMENTS 5,870,607 A * 2/1999 Netzer ............... G06F 11/3664
                                                714/E11.193
6,094,726 A * 7/2000 Gonion ............... G06F 15/8046
                                                713/400

(Continued)

FOREIGN PATENT DOCUMENTS

EP    3785125 A1    3/2021
EP    3785127 A1    3/2021

OTHER PUBLICATIONS

U.S. Appl. No. 16/581,570, filed Sep. 24, 2019.
"Office Action Issued in European Patent Application No. 20735813.6", dated Aug. 16, 2023, 9 Pages.

*Primary Examiner* — Amine Riad
(74) *Attorney, Agent, or Firm* — WORKMAN NYDEGGER

(57) ABSTRACT

During an execution of a first executable entity, a computer system determines that a target chunk of executable instructions is to be recorded during the execution. Prior to executing the target chunk of executable instructions, the computer system identifies one or more input(s) of the target chunk of executable instructions, and adjusts a page table entry to cause a page fault based on an access by a second executable entity to a first memory page that corresponds to an identified input, and/or an access by the first executable entity to a second memory page that does not correspond to any identified input. Based on detecting an occurrence of a page fault during an execution of the target chunk of executable instructions, the computer system detects that there an interference with an identified input by the second executable entity and/or an incompleteness of the identified inputs.

20 Claims, 4 Drawing Sheets

(56) References Cited

U.S. PATENT DOCUMENTS

| | | | | |
|---|---|---|---|---|
| 8,185,829 B2* | 5/2012 | Cannon | ............... | G06Q 30/02 |
| | | | | 715/848 |
| 8,468,501 B2* | 6/2013 | Subhraveti | .......... | G06F 11/3636 |
| | | | | 717/124 |
| 9,038,031 B2* | 5/2015 | Subhraveti | ............ | G06F 11/366 |
| | | | | 717/124 |
| 2008/0250356 A1* | 10/2008 | Johns | ................. | G06F 3/04815 |
| | | | | 715/853 |
| 2011/0302455 A1* | 12/2011 | Thomas | ................ | G06F 21/577 |
| | | | | 714/45 |
| 2016/0232073 A1* | 8/2016 | Cook | ................. | G06F 11/3065 |
| 2017/0052876 A1* | 2/2017 | Svensson | ............ | G06F 11/3466 |

* cited by examiner

REDUCING TRACE RECORDING OVERHEADS WITH TARGETED RECORDING VIA PARTIAL SNAPSHOTS

CROSS-REFERENCE TO RELATED APPLICATIONS

This application is a continuation of U.S. application Ser. No. 16/581,570, filed Sep. 24, 2019, and titled "REDUCING TRACE RECORDING OVERHEADS WITH TARGETED RECORDING VIA PARTIAL SNAPSHOTS," the entire contents of which are incorporated by reference herein in their entirety.

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors might be triggered by a vast variety of factors such as data inputs, user inputs, race conditions (e.g., when accessing shared resources), etc. Given the variety of triggers, undesired software behaviors can be rare and seemingly random, and extremely difficult reproduce. As such, it can be very time-consuming and difficult for a developer to identify a given undesired software behavior. Once an undesired software behavior has been identified, it can again be time-consuming and difficult to determine its root cause(s).

Developers have conventionally used a variety of approaches to identify undesired software behaviors, and to then identify the location(s) in an application's code that cause the undesired software behavior. For example, a developer might test different portions of an application's code against different inputs (e.g., unit testing). As another example, a developer might reason about execution of an application's code in a debugger (e.g., by setting breakpoints/watchpoints, by stepping through lines of code, etc. as the code executes). As another example, a developer might observe code execution behaviors (e.g., timing, coverage) in a profiler. As another example, a developer might insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the execution of at least a portion of a program's thread(s) is recorded into one or more trace files (i.e., a recorded execution). Using some tracing techniques, a recorded execution can contain "bit-accurate" historic trace data, which enables the recorded portion(s) the traced thread(s) to be virtually "replayed" (e.g., via emulation) down to the granularity of individual instructions (e.g., machine code instructions, intermediate language code instructions, etc.). Thus, using "bit-accurate" trace data, diagnostic tools can enable developers to reason about a recorded prior execution of subject code, as opposed to a "live" forward execution of that code. For example, a historic debugger might provide user experiences that enable both forward and reverse breakpoints/watchpoints, that enable code to be stepped through both forwards and backwards, etc. A historic profiler, on the other hand, might be able to derive code execution behaviors (e.g., timing, coverage) from prior-executed code.

As an example, a tracer might emulate execution of a subject thread, while recording information sufficient to reproduce initial processor state for at least one point in a thread's prior execution (e.g., by recording a snapshot of processor registers), along with the data values that were read by the thread's instructions as they executed after that point in time (e.g., the memory reads). This bit-accurate trace can then be used to replay execution of the thread's code instructions (starting with the initial processor state) based on supplying the instructions with the recorded reads. Such trace recording can introduce significant overheads on execution of the subject thread or threads. For instance, to accomplish recording of a thread, the thread may need to be executed via emulation, rather than directly on a processor, in order to observe and record the thread's reads from memory and/or registers.

Additionally, significant challenges arise when recording multi-threaded applications in this manner, since those threads can interact with one another via shared memory. In order to overcome these challenges, many trace recorders emulate multiple threads of an application by executing each thread one-by-one in a linear, rather than a parallel, manner—essentially forcing these applications to execute single-threaded. While this eliminates many of the challenges arising from recording multi-threaded applications, it imposes a significant performance penalty on those applications—both in terms of executing them one thread at a time, and in terms of executing them via emulation rather than directly on a processor.

BRIEF SUMMARY

At least some embodiments described herein reduce the overheads of trace recording by performing a limited recording of an entity (e.g., a process, a thread, etc.) based on recording only targeted code portions of the entity. These targeted recording techniques rely on identifying all of the inputs to a targeted code portion, and using a snapshot of those inputs to record the targeted code portion. These targeted recording techniques can eliminate the need to emulate execution of any portion of the entity during trace recording, or reduce the overheads of emulation if it is performed, while still providing the ability to replay execution of the targeted portion(s) of the entity later. In embodiments, these targeted recording techniques balance a tradeoff between reducing tracing overheads with the absolute accuracy of the resulting trace.

Some embodiments are directed to performing a targeted partial recording of an executable entity. These embodiments execute the executable entity at a processor. While executing the executable entity, these embodiments determine that a target chunk of executable instructions are to be executed as part of the execution of the executable entity. These embodiments identify each input to the target chunk of executable instructions, including identifying at least one non-parameter input, and then record a corresponding value for each identified input into a trace, along with information identifying the target chunk of executable instructions.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
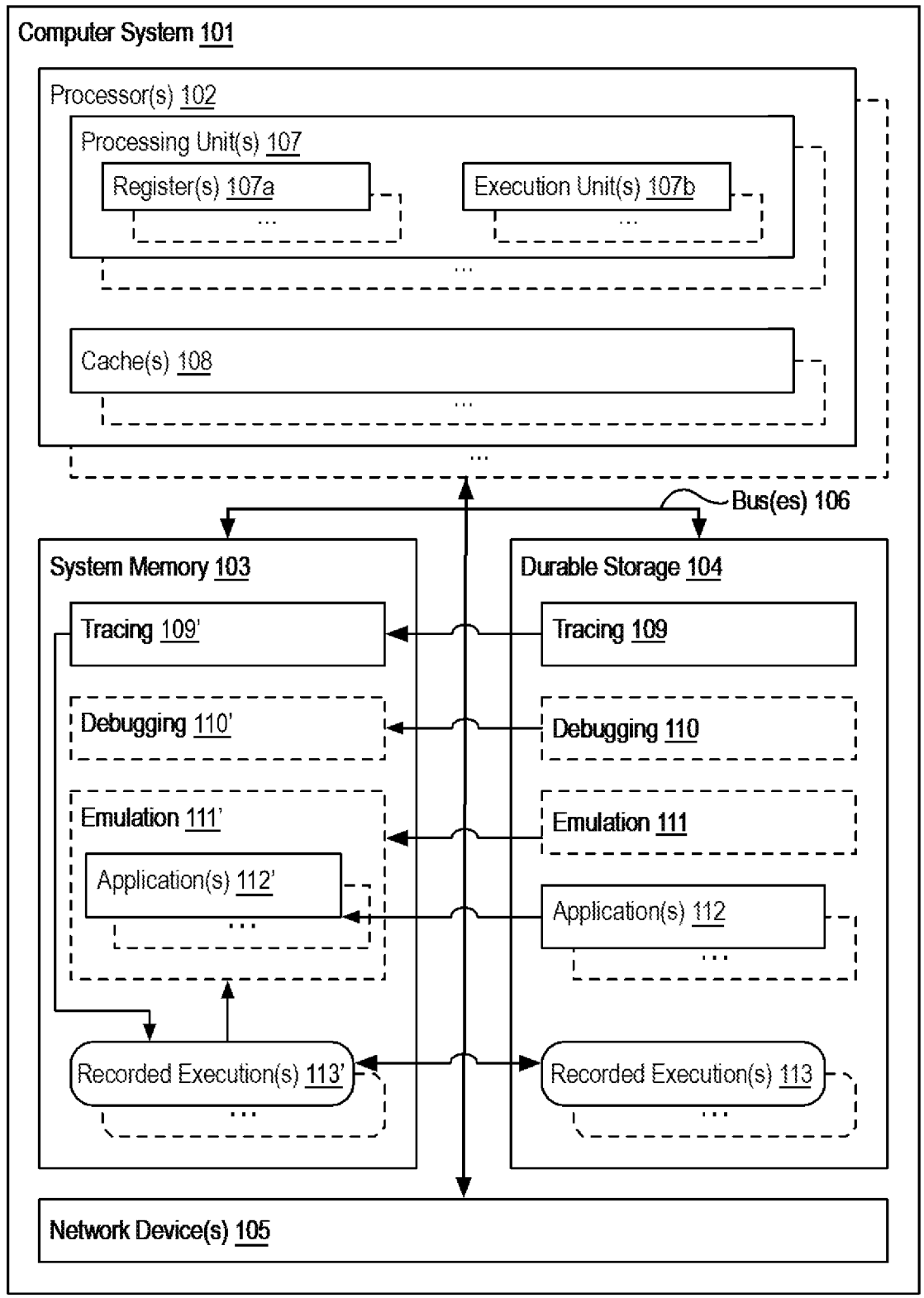
FIG. 1A illustrates an example computing environment that facilitates performing targeted partial recordings of executable entities.

At least some embodiments described herein reduce the overheads of trace recording by performing a limited recording of an entity (e.g., a process, a thread, etc.) based on recording only targeted code portions of the entity. These targeted recording techniques rely on identifying all of the inputs to a targeted code portion, and using a snapshot of those inputs to record the targeted code portion. These targeted recording techniques can eliminate the need to emulate execution of any portion of the entity during trace recording, or reduce the overheads of emulation if it is performed, while still providing the ability to replay execution of the targeted portion(s) of the entity later. In embodiments, these targeted recording techniques balance a tradeoff between reducing tracing overheads with the absolute accuracy of the resulting trace.

Some embodiments trace a targeted code portion by identifying each input consumed by the targeted code portion, and by recording a partial snapshot comprising all of those inputs. These embodiments let the targeted code portion execute normally—without emulating the targeted code portion—which greatly reduces the overheads of recording the code portion as compared to prior techniques. The traced code portion can be replayed via emulation later, based on supplying it with the recorded inputs. In multi-threaded recording environments, a recording of a target code portion executing on a first thread that is recorded using these techniques could potentially miss recording of an interference by a second thread (e.g., if the second thread modifies one or more of the target code portion's inputs). To address these situations, embodiments might use one or more techniques to detect when a recording of a target code portion does not accurately capture the code portion's actual execution at recording time.

For example, one technique might fork the executing entity during recording, causing a forked entity to execute a copy of code portion using a memory space that is separate from a memory space used by the original entity and original code portion. Since the forked entity is executing in a separate memory space, any interference by other threads to the original code portion's inputs should not occur to the forked copy of the code portion's inputs. This technique can then compare the outputs of executing the original code portion with the outputs of executing the forked code portion. If the outputs are the same, there was likely no interference from other threads, or if there was interference that interference had no effect on the code portion's outputs. Thus, the recording of that code portion might be deemed trustworthy. If the outputs differ, there was likely an interference from other threads that affected the code portion's outputs, and the recording of that code portion might be deemed untrustworthy.

Another technique might record, into the trace, information indicative of the target code portion's outputs. For instance, this technique might record the value of each output, record a hash of each output, record a hash over a plurality of outputs, etc. Then, after a later replay of the target code portion based on the recorded inputs snapshot, these techniques can compare the output(s) generated by the target code portion during replay with the recorded information indicative of the target code portion's outputs. If they are the same, then the replay might be deemed to reliably represent the original execution. If they are not, then the replay might be deemed to unreliable.

Another technique might record, into the trace, information at least partially indicative of processor state during execution of the target code portion. For example, information indicative of processor state could include at least a portion of a control flow trace (sometimes also referred to as a branch trace). For instance, a control flow trace could comprise a trace generated by INTEL Processor Trace (IPT) or similar technologies. Then, during replay of the target code portion, this control flow trace could be compared to control flow observed during the replay to determine whether or not the replayed code flow matches the original code flow (and, by extension, whether or not the replay is reliable). As another example, information indicative of processor state could include occasional snapshots(s) of at least a portion of processor state (e.g., a copy or a hash of one or more processor registers). Then, during replay of the target code portion, these snapshot(s) can be compared to processor state generated during replay to determine whether or not the replayed processor state matches the original processor state (and, by extension, whether or not the replay is reliable). As another example, information indicative of processor state could include occasional processor event-based samples. For instance, an event sample could comprise samples generated using INTEL Processor Event-Based Sample (PEBS) or similar technologies. Then, during replay of the target code portion, these samples can be compared to processor samples generated during replay to determine whether or not the replayed samples match the original samples (and, by extension, whether or not the replay is reliable).

Other embodiments might also emulate a targeted code portion to capture a bit-accurate trace of the targeted code portion, but leverage the identified input(s) to the targeted code portion to reduce the overheads of performing that emulation as compared to conventional emulation-based recording techniques. In embodiments, overheads of performing the emulation are reduced by using the identified input(s) to prime a cache (e.g., processor cache, emulate cache, etc.) with the inputs needed by the targeted code portion prior to emulating the code portion. In this way, cache misses on memory corresponding to the identified inputs are avoided during the emulation, increasing emulation performance. Additional embodiments might further defer validating these primed cache entries against a backing memory when the targeted code portion accesses a cache entry during emulation, further increasing emulation performance.

To the accomplishment of the foregoing, FIG. 1A illustrates an example computing environment 100a that facilitates performing targeted partial recordings of executable entities. As depicted, computing environment 100a may comprise or utilize a special-purpose or general-purpose computer system 101, which includes computer hardware, such as, for example, one or more processors 102, system memory 103, durable storage 104, and/or network device(s) 105, which are communicatively coupled using one or more communications buses 106.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network device(s) 105), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, each processor 102 can include (among other things) one or more processing units 107 (e.g., processor cores) and one or more caches 108. Each processing unit 107 loads and executes machine code instructions via the caches 108. During execution of these machine code instructions at one more execution units 107b, the instructions can use internal processor registers 107a as temporary storage locations and can read and write to various locations in system memory 103 via the caches 108. In general, the caches 108 temporarily cache portions of system memory 103; for example, caches 108 might include a "code" portion that caches portions of system memory 103 storing application code, and a "data" portion that caches portions of system memory 103 storing application runtime data. If a processing unit 107 requires data (e.g., code or application runtime data) not already stored in the caches 108, then the processing unit 107 can initiate a "cache miss," causing the needed data to be fetched from system memory 103—while potentially "evicting" some other data from the caches 108 back to system memory 103.

As illustrated, the durable storage 104 can store computer-executable instructions and/or data structures representing executable software components; correspondingly, during execution of this software at the processor(s) 102, one or more portions of these computer-executable instructions and/or data structures can be loaded into system memory 103. For example, the durable storage 104 is shown as potentially storing computer-executable instructions and/or data structures corresponding to a tracing component 109, a debugging component 110, an emulation component 111, and one or more application(s) 112. The durable storage 104 can also store data, such as one or more recorded execution(s) 113 (e.g., traces of application(s) 112 that are generated using historic debugging technologies).

In general, the tracing component 109 records or "traces" execution of one or more of application(s) 112 into the recorded execution(s) 113. The tracing component 109 can record execution of application(s) 112 whether that execution be a "live" execution on the processor(s) 102 directly, whether that execution be a "live" execution on the processor(s) 102 via a managed runtime, and/or whether that execution be an emulated execution via the emulation component 111. Thus, FIG. 1A also shows that the tracing component 109 is also loaded into system memory 103 (i.e., tracing component 109'). An arrow between tracing component 109' and recorded execution(s) 113' indicates that the tracing component 109' can record trace data into recorded execution(s) 113' (which might then be persisted to the durable storage 104 as recorded execution(s) 113). The tracing component 109 can correspond to any type of tool that records a recorded execution 113 as part of execution or emulation of an application 112. For instance, the tracing component 109 might be part of a hypervisor, an operating system kernel, a debugger, a profiler, etc. As will be explained in more detail in connection with FIG. 1B, in accordance with the embodiments herein the tracing component 109 can reduce the overheads of trace recording by performing a limited recording of an entity based on recording only targeted code portions of the entity.

In general, the debugging component 110 leverages the emulation component 111 in order to emulate execution of code of executable entities, such as application(s) 112, based on execution state data obtained from one or more of the recorded execution(s) 113. Thus, FIG. 1A shows that the debugging component 110 and the emulation component 111 are loaded into system memory 103 (i.e., debugging component 110' and emulation component 111'), and that the application(s) 112 are being emulated within the emulation component 111' (i.e., application(s) 112'). The debugging component 110 can correspond to any type of tool that consumes a recorded execution 113 as part of analyzing a prior execution of an application 112. For instance, the debugging component 110 might be a debugger, a profiler, a cloud service, etc.

It is noted that, while the tracing component 109, the debugging component 110, and/or the emulation component 111 might each be independent components or applications, they might alternatively be integrated into the same application (such as a debugging suite), or might be integrated into another software component—such as an operating system component, a hypervisor, a cloud fabric, etc. As such, those skilled in the art will also appreciate that the invention may be practiced in a cloud computing environment of which computer system 101 is a part. For instance, while these components 109-111 might take the form of one or more software applications executed at a user's local computer, they might also take the form of a service provided by a cloud computing environment.

It was mentioned previously that, in embodiments, the tracing component 109 can provide functionality for reducing the overheads of trace recording by performing a limited recording of an entity based on recording only targeted code portions of the entity. To demonstrate how the tracing component 109 might accomplish the foregoing embodiments, FIG. 1B illustrates an example 100b of a tracing component 109 that is configured to perform limited recordings of entities based on recording only targeted code portions of the entity using knowledge of inputs to those targeted code portions.

Figure 1B:
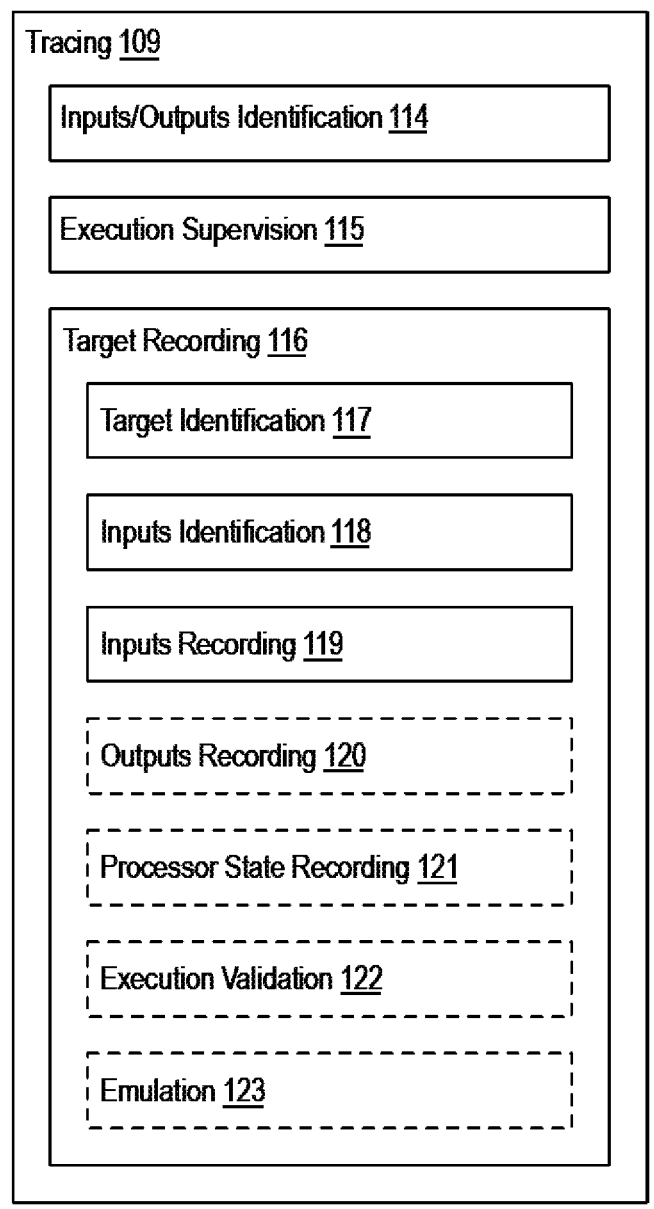
FIG. 1B illustrates an example tracing component that performs a limited recording of an entity based on recording only targeted code portions of the entity.

The depicted tracing component 109 in FIG. 1B includes a variety of components (e.g., inputs/outputs identification 114, execution supervision 115, target recording 116, etc.) that represent various functions that the tracing component 109 might implement in accordance with various embodiments described herein. It will be appreciated that the depicted components—including their identity, sub-components, and arrangement—are presented merely as an aid in describing various embodiments of the tracing component 109 described herein, and that these components are non-limiting to how software and/or hardware might implement various embodiments of the tracing component 109 described herein, or of the particular functionality thereof.

In general, the tracing component 109 performs a limited recording of an entity based on an identification of inputs to targeted code portions to that entity. In embodiments, a targeted code portion comprises a chunk of a sequence of executable instructions that consume zero or more inputs and that produce one or more outputs. A targeted chunk of executable instructions could comprise, for example, one or more functions, one or more modules, one or more basic blocks, a sequence of instructions between thread synchronization events, a sequence of instructions between thread transitions, etc. In embodiments, it is possible for a targeted chunk of instructions to include sequences of instructions that have one or more gaps within their execution. For example, a chunk of instructions might include a sequence of instructions that make a kernel call in the middle of their execution. In this case, the gap might be dealt with by recording any side effects of having executed the kernel call (e.g., by recording memory locations and registers modified by the kernel call). Alternatively, the gap might be avoided by dividing the chunk into two different chucks—one including the instruction(s) before the gap and one including the instruction(s) after the gap. As shown, the tracing component 109 can include an inputs/outputs identification component 114 that can analyze an entity in order to identify all inputs to chunks of instructions that will, or could, be targeted for trace recording. Optionally, the inputs/outputs identification component 114 might also identify all outputs from those chunks of instructions.

As used herein, an "input" to a chunk of instructions is defined as any data location from which the chunk of instructions reads, and to which the chunk itself has not written prior to the read. These data locations could include, for example, registers as they existed the time the chunk was entered, and/or any memory location from which the chunk reads and which it did not itself allocate. An edge case may arise if a chunk allocates memory and then reads from that memory prior to writing to it (i.e., a read from uninitialized memory). In these instances, embodiments might either treat the read to uninitialized memory as an input, or as a bug.

It is noted that, by the foregoing definition, the "inputs" to a chunk of instructions is more expansive than just those parameters that are passed to that chunk. For instance, if a chunk of instructions corresponds to a function, the chunk's inputs would include each memory and/or register location corresponding to each parameter passed to the function (if any) and which are read by the function. However, in addition, the chunk's inputs would also include such things as memory and/or register locations corresponding to global variables that are read by the function, and memory and/or register locations derived from other inputs and which are read by the function. For example, if an input to a function includes a reference to the beginning of an array or a linked list, each element of that array or linked list that is read by the function is also an input to the function. As another example, if an input to a function comprises pointer to a memory address, any memory location that is read by the function based on an offset from that memory address is also an input to the function.

As used herein, an "output" is defined as any data location (e.g., register and/or memory location) to which the chunk of instructions writes that it does not later deallocate. As examples, outputs can include global variables written to by the chunk, memory locations written to by the chunk based on a pointer passed to the chunk, function return values (i.e., if the chunk corresponds to a function), and the like. Notably, a stack allocation at entry of the chunk, followed by a write by the chunk to the allocated area, followed by a stack deallocation at exit from the chunk, and thus could be excluded as an output for the chunk, since that memory was deallocated by the chunk. In addition, if a chunk is delimited by application binary interface (ABI) boundaries (e.g., if the chunk corresponds to a function), then any volatile registers (i.e., registers not used to pass a return value) at exit are implicitly "deallocated" (i.e., they are discarded by the ABI)—and could be excluded as outputs for the chunk.

Notably, the identified inputs and/or outputs could be more expansive than just the locations meeting the foregoing definitions. For example, implementations might treat all written named locations as outputs from a chunk (even if they are deallocated by the chunk) as these written-to locations would be a superset of the outputs meeting the foregoing definition of an output, or might treat all read named locations as inputs to a chunk as these read-from locations would be a superset of all the inputs meeting foregoing definition of an input. It might be less computationally-intensive to identify inputs/outputs when using broader definitions of inputs and/or outputs, with the tradeoff of needing to track more locations which might not strictly be inputs/outputs and which can result in larger snapshots.

In embodiments, the inputs/outputs identification component 114 might take as input an identity of one or more targeted chunk(s) of instructions (e.g., by a named reference such as a function or module name, by instruction address range, etc.) and identify inputs/outputs for only those identified chunk(s) of instructions. However, in embodiments the inputs/outputs identification component 114 might alternatively identify different chunk(s) of instructions in the entity automatically, and then identify inputs/outputs for each identified chunk of instructions. For example, the inputs/outputs identification component 114 might identify chunks corresponding to each function in an entity, and then identify inputs/outputs for each of those functions. As potentially more granular example, the inputs/outputs identification component 114 might alternatively identify chunks corresponding to each basic block in an entity, and then identify inputs/outputs for each of those basic blocks. Of course, the inputs/outputs identification component 114 could use many other techniques to automatically identify chunks, and these examples are for illustrative purposes only.

In embodiments, the inputs/outputs identification component 114 operates prior to, and separate from, a tracing session. Thus, the inputs/outputs identification component 114 can operate in an "offline" mode that is separate from any actual tracing process. However, is also possible to for the inputs/outputs identification component 114 to operate in an "online" mode during a tracing session. For instance, the inputs/outputs identification component 114 might operate at initiation of a tracing session, but prior to performing any tracing, to identify inputs/outputs for one or more portion(s) of an entity. Alternatively, the inputs/outputs identification component 114 might operate on-demand when a targeted chunk of instructions is identified for execution and tracing.

The inputs/outputs identification component 114 can perform one or more types of analysis to identify inputs to a given chunk of instructions and/or outputs from chunk of instructions. In one type of analysis, the inputs/outputs identification component 114 might perform a static analysis of the instructions of the chunk (and of other chunks, if needed for context) to determine which memory and/or register locations the chunk can read from and/or which memory and/or register locations the chunk can write to. In another type of analysis, the inputs/outputs identification component 114 might perform a runtime analysis of the instructions of the chunk (and of other chunks, if needed for context). This type of runtime analysis might, for example, be based on emulating/replaying that chunk based on one or more prior recorded executions 113 of that chunk. In another type of analysis, the inputs/outputs identification component 114 might perform a static analysis of one or more recorded executions 113 of the chunk. As will be appreciated by one of ordinary skill in the art, number and location of the inputs that a given chunk of instructions consumes, and the number and location of the outputs that a given chunk of instructions writes to, might vary from one instance to another based on the values of the inputs. As such, runtime and/or static analysis of recorded executions 113 might be particularly useful to produce a comprehensive list of inputs and outputs, particularly as a number of the recorded executions 113 analyzed increases. In embodiments, debugging symbols and/or code annotations might additionally, or alternatively, be used to identify inputs and/or outputs. For instance, embodiments might leverage NATVIS type descriptors, SAL annotations, code contracts, and the like.

In some implementations, the inputs/outputs identification component 114 might alternatively identify the inputs and/or outputs of a chunk's instructions by instrumenting those instructions (e.g., via instrumentation of source code from which the instructions were compiled, or via instrumentation of the executable instructions directly) so that that inputs and/or outputs are identified by the instrumented instructions during their execution (or emulation). For instance, instrumentations might cause each read and/or write by these instructions to be trapped, so that the locations that are subject to the read and/or write can be logged while handling the trap.

In embodiments, the inputs/outputs identification component 114 can use varying levels of granularity when identifying inputs and outputs. For example, the inputs/outputs identification component 114 might granularly determine that the memory corresponding to a given input or output is a particular number of bits starting at a particular memory address. Alternatively, the inputs/outputs identification component 114 might less granularly determine that memory corresponding to a given input or output is the memory covered by a cache line that was accessed when reading the input (or writing to the output), that memory corresponding to a given input is a memory page was accessed when reading the input (or writing to the output), etc. As will be appreciated, a more granular identification of inputs and/or outputs can result in smaller snapshots of a chunk's inputs than a less granular identification of inputs. However, a performing a more granular identification of inputs and/or outputs can also take more compute time and resources than a less granular identification of inputs. As such, implementation of the inputs/outputs identification component 114 might choose a tradeoff between granularity and use of compute resources.

The execution supervision component 115 can observe and control a target entity's execution at the processor(s) 102. If the target entity comprises native code, the execution supervision component 115 might observe and interact with the entity directly. If the target entity comprises managed code, the execution supervision component 115 might additionally, or alternatively, interact with a managed runtime. In embodiments, the execution supervision component 115 might attach to a currently-running instance of the target entity in order to trace the entity, and/or might initiate execution of the target entity in order to trace the entity.

The target recording component 116 operates to perform a limited, targeted, recording of an entity that is being supervised by the execution supervision component 115, based on recording only targeted chunks of the entity. During a supervised execution of a target entity by the execution supervision component 115, the target identification component 117 can determine when a target chunk of executable instructions are to be executed as part of the execution of the executable entity. For example, the target identification component 117 might identify when a function, basic block, module, etc. of interest is to be executed as part of the entity. Then, based on the upcoming execution of the target chunk of executable instructions, the inputs identification component 118 identifies each input to that target chunk (e.g., input registers, memory locations, etc.).

In some embodiments, the inputs identification component 118 might consult inputs data that was previously generated by the inputs/outputs identification component 114 (e.g., in an offline mode), while in other embodiments, the inputs identification component 118 might call the inputs/outputs identification component 114 to have those inputs identified for the identified target chunk of executable instructions (e.g., in an online mode). In some embodiments, the inputs identification component 118 relies on execution of the target chunk of executable instructions, themselves, for identification for the inputs. For example, the target chunk of executable instructions might have been previously instrumented so that the instrumentations identify the inputs as they are read by the instrumented instructions.

Regardless of how the inputs were identified, the inputs recording component 119 can record a snapshot of those inputs into a recorded execution 113, as part of a trace of the target chunk of executable instructions. For example, the inputs recording component 119 can identify a value for each input (e.g., by consulting the memory location(s) or register(s) corresponding to each input), and store an identification of those memory location(s)/register(s), and their corresponding value(s), into a recorded execution 113 of the target entity. In embodiments, this snapshot data is stored along with information identifying the target chunk of executable instructions. For instance, this information could include a copy of the target chunk of executable instructions, themselves, it could include a memory address or memory address range corresponding to those instructions, it could include an identification of the instructions by function or module name, and the like.

For most chunks of instructions, recording a snapshot of the inputs to the chunk is sufficient to fully and faithfully replay that chunk based on the snapshot. As such, in embodiments, the target recording component 116 concludes recording additional data for the target chunk of executable instructions, and lets those instructions execute normally at the processor(s) 102. As such, in these instances, the target recording component 116 has traced execution of that target chunk without actually emulating the instructions in the target chunk. Thus, while a relatively small amount of compute and memory/storage resources may have been consumed to create and store the snapshot, the tracing has had no additional impact on execution of the instructions, themselves, at the processor(s) 102. Therefore, the overheads of recording those instructions has been greatly reduced, as compared to prior emulation-based tracing techniques.

However, a snapshot of the inputs to a target chunk of instructions may sometimes not be sufficient to fully and faithfully replay that chunk if another entity (e.g., another thread in the same process) wrote to that chunk's inputs during the chunk's execution at the processor(s) 102. These situations are commonly referred to as data races. In embodiments, the tracing component 109 may also record, into the recorded execution 113, additional information usable to verify whether a data race may have affected execution of a target chunk of instructions in a manner that cannot be reproduced from the snapshot of its inputs.

For example, the target recording component 116 is shown as potentially including an outputs recording component 120. If included, the outputs recording component 120 may also record, into the recorded execution 113, information indicative of the output(s) that were generated by the execution of the target chunk of executable instructions at the processor(s) 102. For example, the outputs recording component 120 might record a snapshot of the output(s) (e.g., each output's memory address or register name, and corresponding value), it might record a hash for each output (e.g., a hash over the output's address/name and or its value), it might record a hash over an aggregation of different outputs, and the like. Then, during replay, this information indicative of the output(s) can be compared to output data that is generated by replay of the target chunk of executable instructions based on the inputs snapshot. If the data does not match, then a data race probably occurred during tracing of the target chunk, and the replay does not accurately represent what actually occurred during tracing. If the data does match, then the replay can be deemed reliable/trustworthy, at least as to the outputs. Notably, matching output data may not conclusively indicate that a data race did not occur during tracing, since a data race might have actually occurred during the execution of the chunk at the processor(s) 102, but that data race may have had no effect on the outputs of the chunk.

As another example, the target recording component 116 is shown as potentially including a processor state recording component 121. If included, the processor state recording component 121 may also record, into the recorded execution 113, information indicative of at least a portion of processor state while the target chunk executed at the processor(s) 102. For example, the processor state recording component 121 might record all, or part, of a processor control flow trace. Also referred to as a branch trace, a control flow trace is generally generated by a processor 102, itself, and records a record of which control flow instructions resulted a branch being taken or not taken. While many processor architectures support generation of control flow traces, one example is INTEL's IPT. A recorded control flow trace for a given chunk of instructions can be compared to the control flow taken by those instructions during replay to determine if the replay accurately reproduces the original execution. Additionally, or alternatively, the processor state recording component 121 might record occasional snapshots of processor state. For instance, during execution of a target chunk, the processor state recording component 121 might store occasional hashes based on processor registers at a given point in execution, or record the actual values of those registers. Then, during replay of the target chunk, this recorded processor state can be compared to emulated processor state to determine if the replay accurately reproduces the original execution. Additionally, or alternatively, the processor state recording component 121 might record occasional processor event-based samples in connection with execution of a target chunk, such as those generated by technologies such as INTEL's PEBS. Then, during replay of the target chunk, these recorded samples can be compared to emulated samples to determine if the replay accurately reproduces the original execution.

Notably, using any of the foregoing processor state, recorded processor state might be usable, at replay time, to help estimate when/where a memory race occurred. For instance, if outputs generated during replay don't match the outputs generated during tracing, embodiments might identify which output(s) are different and work backwards through the chunk of instructions to identify those instructions whose execution affected (or could affect) each of those outputs. Using recorded processor state can reduce the search space of this analysis, by helping to pinpoint where execution of those instructions diverged.

In other embodiments, the tracing component 109 actually verifies, during recoding, whether a data race affected execution of a target chunk of instructions in a manner that cannot be reproduced from the snapshot of its inputs alone. For instance, the target recording component 116 might take the outputs verification concept above even further by verifying outputs itself during trace recording. For example, the target recording component 116 is shown as potentially including an execution validation component 122. In embodiments, the execution validation component 122 creates a fork of the entity that is under observation prior to executing the target chunk of instructions. Then, both the target entity and the fork of the target entity are permitted to execute their respective copy of the target chunk of instructions.

Figure 2:
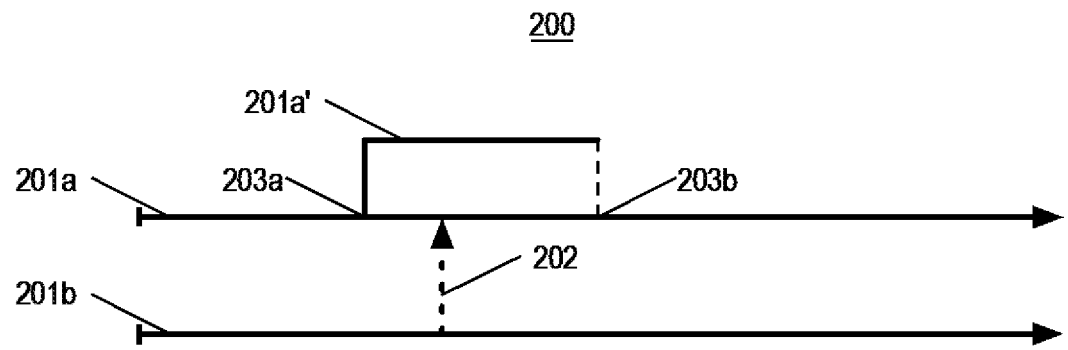
FIG. 2 illustrates an example of forking a thread to verify if a data race occurred on an original thread.

FIG. 2, for example, illustrates an example 200 representing a timeline of execution of related threads 201. In particular, thread 201a represents an entity that under observation by the execution supervision component 115. At execution time point 203a, example 200 shows that execution of thread 201a is forked (e.g., by the execution validation component 122) to initiate execution of thread 201a'. Execution time point 203a might correspond, for example, to the beginning of execution of a target chunk of instructions that is begin traced by the target recording component 116. In embodiments, creating a fork of the entity creates a separate memory space for the forked entity. Thus, thread 201a' executes its copy of the target chunk of instructions using different a memory space than thread 201a, and is therefore isolated from data races occurring on thread 201a. For example, arrow 202 shows that, during execution of the target chunk of instructions on forked thread 201a', thread 202b performs a write to memory used by thread 201a. However, as shown, this write does not affect forked thread 201a'. After execution of the target chunk of instructions, the execution validation component 122 can compare the outputs of target chunk of instructions generated by thread 201a with the outputs of target chunk of instructions generated by forked thread 201a'. For example, a line at execution time point 203b represents a comparison (e.g., by the execution validation component 122) of the outputs of executing the target instructions on each of original thread 201a and forked thread 201a'. If these outputs match, then the inputs snapshot generated by the inputs recording component 119 can be deemed a reliable representation of execution of the target chunk on thread 201a; If they don't match, however, then a data race probably occurred on thread 201a (i.e., the write by thread 201b at arrow 202), and the inputs snapshot cannot be deemed a reliable representation of execution of the target chunk on thread 201a. In this latter case, the target recording component 116 might record an indication that the recorded snapshot is unreliable, might choose not to record the snapshot, might raise an alert, etc.

In embodiments, the execution validation component 122 can support execution of a chunk of instructions in a forked thread, even when that chunk of instructions make a kernel call or a call to other non-traced code. For instance, the execution validation component 122 might determine whether or not the call is idempotent (e.g., based on whether it writes to any of the chunk's inputs and/or outputs). If the call is non-idempotent, the execution validation component 122 might simply allow the forked thread to make the call.

If the call is idempotent, however, the execution validation component 122 might treat the chunk of instructions as two different chunks—a first leading up to the call, and a second after the call. Thus, the inputs identification component 118 can identify inputs and outputs for each of these chunks. Then, the execution validation component 122 can compare the outputs of executing the first chunk in a forked thread with the outputs of executing the first chunk in the original thread, and also compare the outputs of executing the second chunk in a forked thread with the outputs of executing the second chunk in the original thread. In embodiments, the first and second chunks might be executed in different forked threads. However, it might also be possible to execute them in the same forked thread if the call takes the same inputs in both the original and forked threads, by applying the side effects of executing the call on the original thread (i.e., its writes) to the memory space of the forked thread prior to the second chunk's execution on the forked thread. If the precise set of inputs to the call cannot be determined, they might be able to be proxied as the inputs to the first chunk plus the set of outputs produced by the first chunk in both forks.

In other embodiments, the execution validation component 122 additionally, or alternatively, relies on use of page table entries (PTEs) to determine, during recording, if another thread interferes with the thread being traced. In this embodiment, the execution validation component 122 might even be able to identify the particular input(s) that were interfered with. In particular, the execution validation component 122 can modify the PTEs for any pages corresponding to inputs to the target chunk of instructions as being protected—e.g., as being valid for the subject thread and invalid for other threads. Then, if any other thread attempts to write to memory in those pages during execution of the target chunk of instructions on the subject thread, a page fault will occur and a potential interference can be noted.

In embodiments, the execution validation component 122 could even use PTEs to determine if the subject thread tried to access a memory location that was not included in its list of identified inputs. For example, the execution validation component 122 can modify the PTEs for any pages not corresponding to inputs to the target chunk of instructions as being protected—e.g., as being invalid for the subject thread. Then, if the subject thread attempts to access memory in those pages during execution of the target chunk of instructions, a page fault will occur and an access to memory not identified as an input can be noted.

In embodiments, the target recording component 116 might choose to actually emulate the target chunk of executable instructions. As such, the target recording component 116 is shown as potentially including an emulation component 123. In connection with emulation by the emulation component 123, the target recording component 116 can record a detailed trace of those instruction's execution. For example, a user might have provided an indication that the target chunk of executable instructions should be recorded with a greater level of detail (e.g., due to a particular interest in the behaviors of that target chunk). As another example, the target recording component 116 might determine (e.g., based on the execution validation component 122) that a prior recording of the target chunk exhibited signs of a data race, triggering a more granular trace of the current instance of the target chunk.

Figure 3:
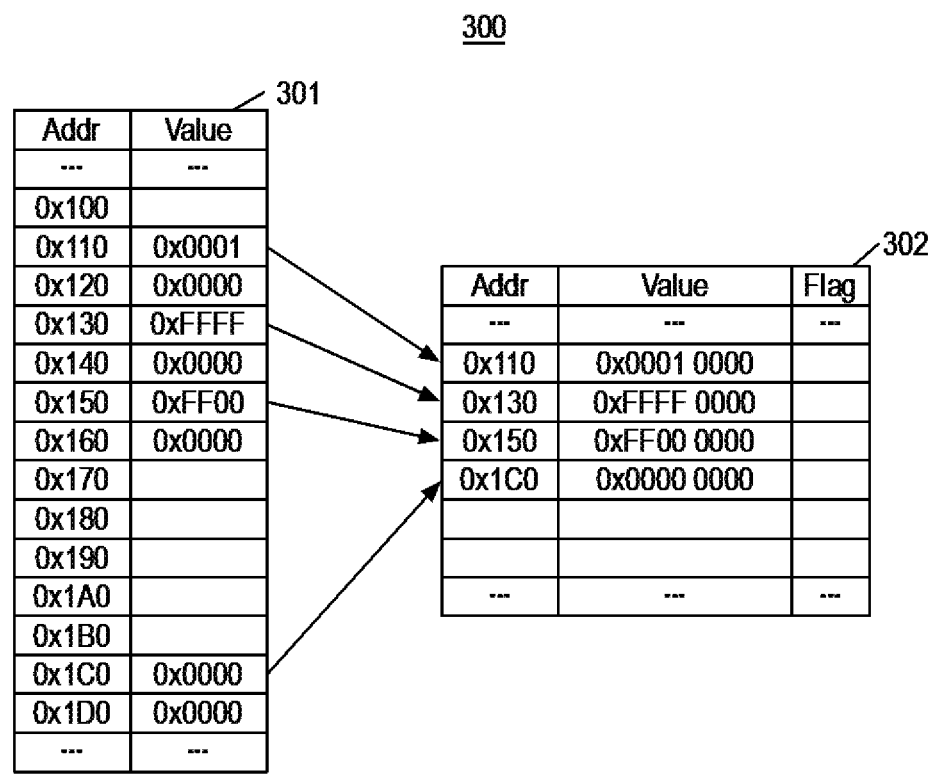
FIG. 3 illustrates an example of priming a cache as part of performing an emulation of a target code portion, and of deferred cache entry validation.

While emulation and recording of the target chunk will incur additional overheads verses simply letting the chunk execute normally at the processor(s) 102, the emulation component 123 can leverage knowledge of the chunk's inputs (i.e., as identified by the inputs identification component 118) to improve the performance of that emulation. In embodiments, prior to emulating the target chunk, the emulation component 123 primes a cache (e.g., cache(s) 108) with cache entries covering memory addresses/values stored in the snapshot recorded by the inputs recording component 119. For example, FIG. 3 illustrates an example 300 of priming a cache with inputs. In particular, example 300 shows a portion of a memory 301 (e.g., system memory 103) and a portion of a cache 302 (e.g., cache(s) 108). In FIG. 3, memory locations 0x110 through 0x160 and memory locations 0x1C0 through 0x1D0 have been identified by the emulation component 123 as corresponding to inputs to a target chunk of instructions. For example, these inputs might correspond to four 32-bit variables, stored beginning at memory addresses 0x110, 0x130, 0x150, and 0x1C0. As shown, prior to emulating the target chunk of instructions, the emulation component 123 can prime the cache 302 with cache entries that cover these memory locations. Then, when the emulation component 123 emulates the target chunk of instructions, cache misses can be avoided when the target chunk of instructions accesses these memory locations, greatly speeding up the speed of the emulation.

When a cache utilizes an existing cache entry, the cache may validate the value stored in the cache entry against the cache's backing store (e.g., system memory 103) to ensure that the data in the cache entry is current. In embodiments, after priming a cache, the emulation component 123 causes these validations to be deferred—again, greatly speeding up the speed of emulation. In embodiments, these deferrals are based on an assumption that the entity being recorded does not perform cross-thread coordination (e.g., via shared memory with other threads) without first properly using cross-thread synchronization techniques (e.g., mutexes, semaphores, etc.). Thus, the emulation component 123 might cause these validations to be deferred until the next cross-thread synchronization event. At a cross-thread synchronization event, the emulation component 123 might cause the cache entries to be fully validated (e.g., by confirming each one with system memory 103). Alternatively, the emulation component 123 might cause the cache entries to be lazily validated. For example, in FIG. 3, the cache 302 is shown as including a flag for each cache entry. In embodiments, this flag can be used to indicate if the corresponding cache entry should be validated against the backing store the next time it is accessed. Thus, for example, the emulation component 123 might cause these flags to be cleared when a cache entry is primed. Then, at a cross-thread synchronization event, the emulation component 123 might cause these flags to be set (at least for the primed cache entries). Later, if one of these cache entries is accessed it can be validated against the backing store, updated if needed, and its flag can be cleared.

Notably, by priming a cache, the emulation component 123 can determine, at tracing time, if the identification of inputs to a given chunk of instructions actually included all of the inputs. For instance, after priming the cache for a given chunk of instructions, if execution of the target instructions results in a cache miss, the emulation component 123 can determine that the memory accessed as part of the cache miss should have been included as an input. This cache miss can be recorded to ensure a complete trace, and the identification of inputs for that chunk of instructions can be updated to include this memory address.

In embodiments, the target recording component 116 might additionally, or alternatively, record a more granular execution of a chunk of instructions based on instrumentation of those instructions. For example, just as instructions might be instrumented to generate an identification of their inputs (and/or outputs), they may additionally, or alternatively, be instrumented to generate a record of their reads (and the value read) and/or their writes (and/or the value written). As such, execution of an instrumented target chunk of instructions could result in generation of trace data that is then recorded into a recorded execution 113.

Figure 4:
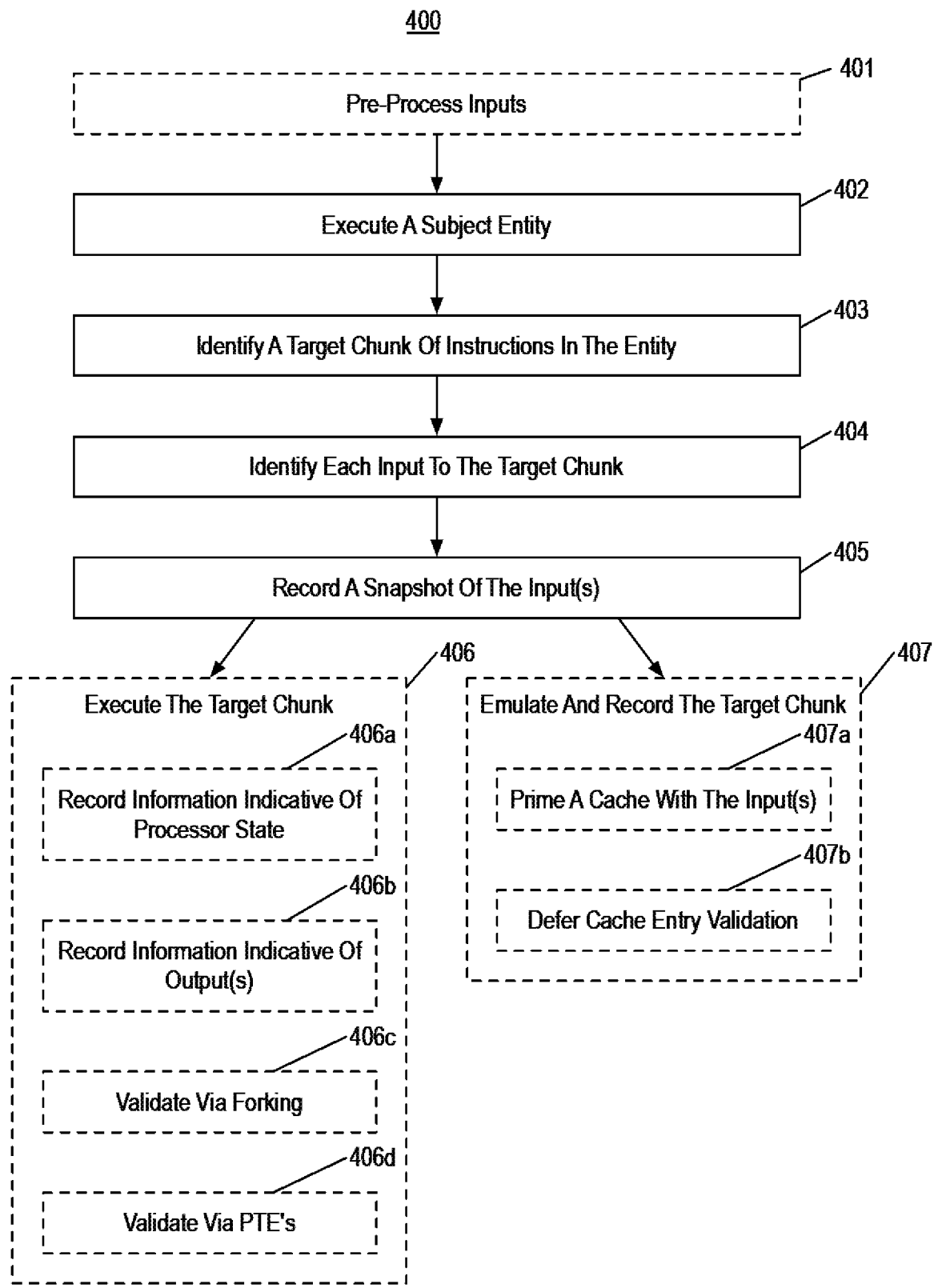
FIG. 4 illustrates a flow chart of an example method for performing a targeted partial recording of an executable entity.

FIG. 4 illustrates a flowchart of an example method 400 for performing a targeted partial recording of an executable entity. Method 400 will now be described within the context of with FIGS. 1-3. While, for ease in description, the acts of method 400 are shown in a sequential linear order, it will be appreciated that some of these acts might be implemented in different orders, and/or in parallel.

As shown in FIG. 4, method 400 can include an act 401 of pre-processing inputs. In some embodiments, act 401 comprises pre-processing an executable entity to identify each input to one or more target chunks of executable instructions. For example, the inputs/outputs identification component 114 can analyze a chunk of executable instructions of an application 112 to identify the chunk's inputs and/or its outputs. Act 401 is shown in broken lines, since the act might be performed as part of a partial recording session (e.g., an "online" mode), or it might be performed prior to that session (e.g., an "offline" mode). As discussed when describing the inputs/outputs identification component 114, identifying each input to the target chunk of executable instructions might be based on having performed at least one of (i) a static analysis of the target chunk of executable instructions, (ii) a static analysis of a recorded execution of the target chunk of executable instructions, (iii) an emulation of the target chunk of executable instructions, (iv) an instrumentation of the target chunk of executable instructions, and/or (v) an analysis of at least one of debugging symbols or code annotations.

Method 400 also includes an act 402 of executing a subject entity. In some embodiments, act 402 comprises executing the executable entity at the at least one processor. For example, the execution supervision component 115 can supervise execution of one or more threads of an application 112 at processor(s) 102. In embodiments, the execution supervision component 115 might initiate execution of application 112 as part of method 400, or attach to an existing instance of an application 112 already executing at processor(s) 102.

Method 400 also includes an act 403 of identifying a target chunk of instructions in the entity. In some embodiments, act 403 comprises, while executing the executable entity, determining that a target chunk of executable instructions are to be executed as part of the execution of the executable entity. For example, based on the supervision by the execution supervision component 115, the target identification component 117 can identify when a target chunk of instructions is to be executed. For instance, the target identification component 117 might identify when a particular function is to be executed, when an instruction at a particular address is to be executed, etc.

Method 400 also includes an act 404 of identifying each input to the target chunk. In some embodiments, act 404 comprises identifying each input to the target chunk of executable instructions, including identifying at least one non-parameter input. For example, the inputs identification component 118 can identify one or more inputs based on data identified by the inputs/outputs identification component 114, either during operation of method 400, or prior to operation of method 400.

Method 400 also includes an act 405 of recording a snapshot of the input(s). In some embodiments, act 405 comprises recording a corresponding value for each identified input into a trace, along with information identifying the target chunk of executable instructions. For example, for each identified input, inputs recording component 119 can obtain a value for the input (e.g., from memory, from a register, etc.) and store into a recorded execution 113 an identification of the inputs (e.g., memory address, register name, etc.) and a value for the inputs. In addition, this snapshot can be stored in the recorded execution 113 in a manner that associates it with the appropriate target chunk of instructions. For instance, the recorded execution 113 could include the instructions themselves, or a reference to the instructions (e.g., by instruction address, by function or module name, etc.).

As discussed, after recording an inputs snapshot, the target chunk might be executed directly. Thus, method 400 might proceed to execute the target chunk at the processor(s) 102 (act 406). Alternatively, however, detailed tracing information for the target chunk might be obtained by emulating the target chunk. Thus, method 400 might alternatively proceed to emulate and record the target chunk (act 407).

If method 400 proceeds to act 406 for executing the target chunk, method 400 might perform one or more validation and/or recording actions. For example, executing the target chunk in act 406 might include one or more of recording information indicative of output(s) (act 406a), recording information indicative of processor state (act 406b), validating via forking (act 406c), and/or validating via PTEs (act 406d).

In act 406a, the outputs recording component 120 could record information about the output(s) of having executed the target chunk of instructions at the processor(s) 102. For instance, the outputs recording component 120 might record a corresponding value for each output of execution of the target chunk of executable instructions, or record one or more hashes based on the corresponding value for each output of the execution of the target chunk of executable instructions. This output information is then usable to validate whether a replayed execution of the target chunk of executable instructions deviated from execution of the target chunk of executable instructions as part of the execution of the executable entity.

In act 406b, the processor state recording component 121 could record processor state information usable as a partial trace of the execution of the target chunk of executable instructions. For instance, the processor state recording component 121 might record one or more of one or more snapshots of processor state, one or more hashes of processor state, a control flow trace (e.g., INTEL's IPT), or one or more processor event based samples (e.g., INTEL's PEBS). This processor state is then usable to validate whether a replayed execution of the target chunk of executable instructions deviated from execution of the target chunk of executable instructions as part of the execution of the executable entity.

In act 406c, the execution validation component 122 could use forking to validate, at record time, whether or not a replay based on inputs snapshot would produce that same outputs as the execution of the target chunk at the processor(s) 102. For example, act 406c could include forking execution of the executable entity, and executing a forked target chunk of executable instruction. Then, act 406c could include comparing outputs of executing the target chunk of executable instructions with outputs of executing the forked target chunk of executable instructions, to determine if the execution of the forked target chunk of executable instructions deviated from the execution of the target chunk of executable instructions.

In act 406d, the execution validation component 122 could use PTEs to validate if another entity interfered with the subject entity. For example, the execution validation component 122 could mark one or more PTEs not corresponding to each input to the target chunk of executable instructions as invalid for the executable entity. Then, based on marking the one or more PTEs, the execution validation component 122 could detect an access by the executable entity and then determine from the access that the identified inputs to the target chunk of executable instructions were incomplete for the target chunk of executable instructions.

In act 406d, the execution validation component 122 could additionally, or alternatively, use PTEs to detect if the list of identified inputs was incomplete. For example, the execution validation component 122 could mark one or more PTEs not corresponding to each input to the target chunk of executable instructions as invalid for the executable entity. Then, based on marking the one or more PTEs, the execution validation component 122 could detect an access by the executable entity and then determine that the identified inputs to the target chunk of executable instructions were incomplete for the target chunk of executable instructions.

Alternatively, if method 400 proceeds to act 407 for emulating and recording the target chunk, method 400 might include one or more of priming a cache with the input(s) (act 407a) and/or deferring cache entry validation (act 407b).

In act 407a, the emulation component 123 could prime a cache with cache entries covering each identified input. Then, after priming the cache, the emulation component 123 could emulate execution of the target chunk of executable instructions while recording the emulated execution of the target chunk of executable instructions into the trace.

After priming the cache, while emulating the execution of the target chunk of executable instructions, in act 407b the emulation component 123 could defer validation of one or more primed cache entries with a backing memory until a synchronization event. Then, in connection with reaching the synchronization event, the emulation component 123 might fully validate each of the primed cache entries with the backing memory, or tag each of the primed cache entries for a lazy validation.

In embodiments, the executable entity might be instrumented to record each input to the target chunk of executable instructions. Thus, in method 400, the executable entity might generate trace data during execution of the target chunk of executable instructions.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms comprising," "including," and "having" are intended to be inclusive and mean that there may be additional elements other than the listed elements.

What is claimed:

1. A method, implemented at a computer system that includes at least one processor, the method comprising:
during an execution of a first executable entity at the at least one processor, determining that a target chunk of executable instructions that is to be executed as part of the execution of the first executable entity is to be recorded during the execution of the first executable entity;
prior to executing the target chunk of executable instructions:
identifying one or more inputs of the target chunk of executable instructions, including identifying at least one non-parameter input of the target chunk of executable instructions, and
adjusting at least one page table entry (PTE) to cause a page fault based on at least one of (a) an access by a second executable entity to a first memory page, the first memory page corresponding to at least one of the identified one or more inputs; or (b) an access by the first executable entity to a second memory page, the second memory page not corresponding to any of the identified one or more inputs;
executing the target chunk of executable instructions at the at least one processor; and
based on detecting an occurrence of a page fault during the execution of the target chunk of executable instructions at the at least one processor, detecting that there was at least one of (a) an interference with at least one of the identified one or more inputs by the second executable entity due to an access by the second executable entity to the first memory page, or (b) an incompleteness of the identified one or more inputs based on an access by the first executable entity to the second memory page.

2. The method of claim 1, wherein, based on adjusting at least one PTE to cause a page fault based on an access by the second executable entity to the first memory page, the method includes detecting that there was an interference with at least one of the identified one or more inputs by the second executable entity due to an access by the second executable entity to the first memory page.

3. The method of claim 1, wherein, based on adjusting at least one PTE to cause a page fault based on an access by the first executable entity to the second memory page, the method includes detecting that there was an incompleteness of the identified one or more inputs based on an access by the first executable entity to the second memory page.

4. The method of claim 1, further comprising, prior to executing the target chunk of executable instructions:
recording a corresponding value for each identified input into a partial recording of the execution of the first executable entity, along with information identifying the target chunk of executable instructions.

5. The method of claim 1, further comprising recording information usable to validate whether a replayed execution of the target chunk of executable instructions deviated from execution of the target chunk of executable instructions as part of the execution of the first executable entity, the information comprising at least one of:
a corresponding value for each output of execution of the target chunk of executable instructions;
one or more hashes based on the corresponding value for each output of the execution of the target chunk of executable instructions; or
a partial trace of the execution of the target chunk of executable instructions, including at least one of: one or more snapshots of processor state, one or more hashes of processor state, a control flow trace, or one or more processor event based samples.

6. The method of claim 1, wherein identifying the one or more inputs of the target chunk of executable instructions is based on having performed at least one of:

a static analysis of the target chunk of executable instructions;

a static analysis of a recorded execution of the target chunk of executable instructions;

an emulation of the target chunk of executable instructions; or an analysis of at least one of debugging symbols or code annotations.

7. The method of claim 1, further comprising:

priming a cache with cache entries covering each identified input; and after priming the cache, emulating execution of the target chunk of executable instructions while recording the emulated execution of the target chunk of executable instructions into a partial recording of the execution of the first executable entity.

8. The method of claim 7, further comprising, while emulating the execution of the target chunk of executable instructions:

deferring validation of one or more primed cache entries with a backing memory until a synchronization event.

9. The method of claim 8, further comprising, in connection with reaching the synchronization event, performing at least one of:

validating each of the one or more primed cache entries with the backing memory; or tagging each of the one or more primed cache entries for a lazy validation.

10. The method of claim 1, further comprising:

forking execution of the first executable entity, and executing a forked target chunk of executable instructions; and comparing outputs of executing the target chunk of executable instructions with outputs of executing the forked target chunk of executable instructions, to determine if the execution of the forked target chunk of executable instructions deviated from the execution of the target chunk of executable instructions.

11. A computer system comprising:

a processor; and a computer-readable medium having stored thereon computer-executable instructions that are executable by the processor to cause the computer system to at least:

during an execution of a first executable entity at the processor, determine that a target chunk of executable instructions that is to be executed as part of the execution of the first executable entity is to be recorded during the execution of the first executable entity;

prior to executing the target chunk of executable instructions:

identify one or more inputs of the target chunk of executable instructions, including identifying at least one non-parameter input of the target chunk of executable instructions, and adjust at least one page table entry (PTE) to cause a page fault based on at least one of (a) an access by a second executable entity to a first memory page, the first memory page corresponding to at least one of the identified one or more inputs; or (b) an access by the first executable entity to a second memory page, the second memory page not corresponding to any of the identified one or more inputs;

execute the target chunk of executable instructions at the processor; and based on detecting an occurrence of a page fault during the execution of the target chunk of executable instructions at the processor, detect that there was at least one of (a) an interference with at least one of the identified one or more inputs by the second executable entity due to an access by the second executable entity to the first memory page, or (b) an incompleteness of the identified one or more inputs based on an access by the first executable entity to the second memory page.

12. The computer system of claim 11, wherein, based on adjusting at least one PTE to cause a page fault based on an access by the second executable entity to the first memory page, the computer system detects that there was an interference with at least one of the identified one or more inputs by the second executable entity due to an access by the second executable entity to the first memory page.

13. The computer system of claim 11, wherein, based on adjusting at least one PTE to cause a page fault based on an access by the first executable entity to the second memory page, the computer system detects that there was an incompleteness of the identified one or more inputs based on an access by the first executable entity to the second memory page.

14. The computer system of claim 11, the computer-executable instructions also executable by the processor to cause the computer system to, prior to executing the target chunk of executable instructions:

record a corresponding value for each identified input into a partial recording of the execution of the first executable entity, along with information identifying the target chunk of executable instructions.

15. The computer system of claim 11, the computer-executable instructions also executable by the processor to cause the computer system to record information usable to validate whether a replayed execution of the target chunk of executable instructions deviated from execution of the target chunk of executable instructions as part of the execution of the first executable entity, the information comprising at least one of:

a corresponding value for each output of execution of the target chunk of executable instructions;

one or more hashes based on the corresponding value for each output of the execution of the target chunk of executable instructions; or a partial trace of the execution of the target chunk of executable instructions, including at least one of: one or more snapshots of processor state, one or more hashes of processor state, a control flow trace, or one or more processor event based samples.

16. The computer system of claim 11, wherein identifying the one or more inputs of the target chunk of executable instructions is based on having performed at least one of:

a static analysis of the target chunk of executable instructions;

a static analysis of a recorded execution of the target chunk of executable instructions;

an emulation of the target chunk of executable instructions; or an analysis of at least one of debugging symbols or code annotations.

17. The computer system of claim 11, the computer-executable instructions also executable by the processor to cause the computer system to:

prime a cache with cache entries covering each identified input; and after priming the cache, emulate execution of the target chunk of executable instructions while recording the emulated execution of the target chunk of executable instructions into a partial recording of the execution of the first executable entity.

18. The computer system of claim 17, the computer-executable instructions also executable by the processor to cause the computer system to, while emulating the execution of the target chunk of executable instructions:
defer validation of one or more primed cache entries with a backing memory until a synchronization event.

19. The computer system of claim 11, the computer-executable instructions also executable by the processor to cause the computer system to:
fork execution of the first executable entity, and execute a forked target chunk of executable instructions; and
compare outputs of executing the target chunk of executable instructions with outputs of executing the forked target chunk of executable instructions, to determine if the execution of the forked target chunk of executable instructions deviated from the execution of the target chunk of executable instructions.

20. A computer program product comprising a hardware storage device having stored thereon computer-executable instructions that are executable by a processor to cause a computer system to at least:
during an execution of a first executable entity at the processor, determine that a target chunk of executable instructions that is to be executed as part of the execution of the first executable entity is to be recorded during the execution of the first executable entity;
prior to executing the target chunk of executable instructions:
identify one or more inputs of the target chunk of executable instructions, including identifying at least one non-parameter input of the target chunk of executable instructions, and
adjust at least one page table entry (PTE) to cause a page fault based on at least one of (a) an access by a second executable entity to a first memory page, the first memory page corresponding to at least one of the identified one or more inputs; or (b) an access by the first executable entity to a second memory page, the second memory page not corresponding to any of the identified one or more inputs;
execute the target chunk of executable instructions at the processor; and
based on detecting an occurrence of a page fault during the execution of the target chunk of executable instructions at the processor, detect that there was at least one of (a) an interference with at least one of the identified one or more inputs by the second executable entity due to an access by the second executable entity to the first memory page, or (b) an incompleteness of the identified one or more inputs based on an access by the first executable entity to the second memory page.

* * * * *